(12) United States Patent
Goodrich et al.

(10) Patent No.: US 11,455,078 B1
(45) Date of Patent: Sep. 27, 2022

(54) SPATIAL NAVIGATION AND CREATION INTERFACE

(71) Applicant: Snap Inc., Santa Monica, CA (US)

(72) Inventors: Kyle Goodrich, Venice, CA (US);
Andrew James McPhee, Culver City, CA (US); Daniel Moreno, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 17/301,284

(22) Filed: Mar. 30, 2021

Related U.S. Application Data

(60) Provisional application No. 63/003,057, filed on Mar. 31, 2020.

(51) Int. Cl.
*G06F 3/0482* (2013.01)
*G06F 3/04847* (2022.01)
*G06F 3/0488* (2022.01)

(52) U.S. Cl.
CPC .......... *G06F 3/0482* (2013.01); *G06F 3/0488* (2013.01); *G06F 3/04847* (2013.01); *G06F 2203/04104* (2013.01); *G06F 2203/04806* (2013.01)

(58) Field of Classification Search
CPC ... G06F 3/0482; G06F 3/04847; G06F 3/0488
See application file for complete search history.

(56) References Cited

U.S. PATENT DOCUMENTS

| | | | |
|---|---|---|---|
| 7,971,156 B2 | 6/2011 | Albertson et al. | |
| 9,225,897 B1 | 12/2015 | Sehn et al. | |
| 9,276,886 B1 | 3/2016 | Samaranayake | |
| 9,292,082 B1 | 3/2016 | Patel et al. | |
| 9,705,831 B2 | 7/2017 | Spiegel | |
| 9,742,713 B2 | 8/2017 | Spiegel et al. | |
| 10,061,352 B1 | 8/2018 | Trail | |
| 10,102,423 B2 | 10/2018 | Shaburov et al. | |
| 10,284,508 B1 | 5/2019 | Allen et al. | |
| 10,439,972 B1 | 10/2019 | Spiegel et al. | |

(Continued)

OTHER PUBLICATIONS

U.S. Appl. No. 16/850,586, filed Apr. 16, 2020, Spatial Navigation and Creation Interface.

(Continued)

*Primary Examiner* — Seth A Silverman
(74) *Attorney, Agent, or Firm* — Schwegman Lundberg & Woessner, P.A.

(57) ABSTRACT

Systems and methods are provided for navigating messaging application interfaces. The systems and methods include operations for: displaying, by a messaging application of a user device, a menu comprising a first set of options relating to a first level in a hierarchy of levels; detecting, by a touch sensor, one finger touch of a first option of the first set of options; in response to detecting the one finger touch of the first option, displaying, by the messaging application, a second set of options related to the first option, the second set of options relating to a second level in the hierarchy of levels; detecting, by the touch sensor, two finger touch of a second option of the second set of options; and in response to detecting the two finger touch of the second option, re-displaying, by the messaging application, the first set of options.

20 Claims, 11 Drawing Sheets

(56) References Cited

U.S. PATENT DOCUMENTS

| | | | |
|---|---|---|---|
| 10,509,466 B1 | 12/2019 | Miller et al. | |
| 10,514,876 B2 | 12/2019 | Sehn | |
| 10,614,855 B2 | 4/2020 | Huang | |
| 10,748,347 B1 | 8/2020 | Li et al. | |
| 10,958,608 B1 | 3/2021 | Allen et al. | |
| 10,962,809 B1 | 3/2021 | Castañeda | |
| 10,996,846 B2 | 5/2021 | Robertson et al. | |
| 10,997,787 B2 | 5/2021 | Ge et al. | |
| 11,012,390 B1 | 5/2021 | Al Majid et al. | |
| 11,030,454 B1 | 6/2021 | Xiong et al. | |
| 11,036,368 B1 | 6/2021 | Al Majid et al. | |
| 11,062,498 B1 | 7/2021 | Voss et al. | |
| 11,087,728 B1 | 8/2021 | Canberk et al. | |
| 11,092,998 B1 | 8/2021 | Castañeda et al. | |
| 11,106,342 B1 | 8/2021 | Al Majid et al. | |
| 11,126,206 B2 | 9/2021 | Meisenholder et al. | |
| 11,143,867 B2 | 10/2021 | Rodriguez, II | |
| 11,169,600 B1 | 11/2021 | Canberk et al. | |
| 11,227,626 B1 | 1/2022 | Krishnan Gorumkonda et al. | |
| 2005/0076309 A1* | 4/2005 | Goldsmith | G06F 3/0482 715/811 |
| 2012/0144331 A1* | 6/2012 | Tolonen | G06F 3/0486 715/769 |
| 2012/0236031 A1 | 9/2012 | Haddick et al. | |
| 2014/0115114 A1 | 4/2014 | Garmark et al. | |
| 2014/0267189 A1* | 9/2014 | Moll | G06F 3/04886 345/179 |
| 2015/0103021 A1 | 4/2015 | Lim et al. | |
| 2015/0324087 A1* | 11/2015 | Gregory | G06F 3/04845 345/174 |
| 2016/0259517 A1* | 9/2016 | Butcher | G06F 3/0488 |
| 2017/0046058 A1 | 2/2017 | Karunamuni et al. | |
| 2017/0111723 A1 | 4/2017 | Boesen | |
| 2018/0062691 A1 | 3/2018 | Barnett, Jr. | |
| 2019/0187765 A1 | 6/2019 | Ashwood et al. | |
| 2019/0205010 A1 | 7/2019 | Fujii et al. | |
| 2019/0340799 A1 | 11/2019 | Dryer et al. | |
| 2020/0036830 A1* | 1/2020 | Hatanaka | G06F 3/04886 |
| 2020/0104039 A1 | 4/2020 | Robertson et al. | |
| 2020/0279104 A1* | 9/2020 | Andersen | A63F 13/537 |
| 2020/0293155 A1* | 9/2020 | Shin | G06F 3/0482 |
| 2020/0301575 A1 | 9/2020 | Lindholm et al. | |
| 2020/0387228 A1* | 12/2020 | Ravasz | G06F 3/011 |
| 2021/0011612 A1 | 1/2021 | Dancie et al. | |
| 2021/0074016 A1 | 3/2021 | Li et al. | |
| 2021/0166732 A1 | 6/2021 | Shaburova et al. | |
| 2021/0241529 A1 | 8/2021 | Cowburn et al. | |
| 2021/0303075 A1 | 9/2021 | Cowburn et al. | |
| 2021/0303077 A1 | 9/2021 | Anvaripour et al. | |
| 2021/0303140 A1 | 9/2021 | Mourkogiannis | |
| 2021/0334733 A1* | 10/2021 | Peters | G06Q 10/10 |
| 2021/0382564 A1 | 12/2021 | Blachly et al. | |
| 2021/0397000 A1 | 12/2021 | Rodriguez, II | |

OTHER PUBLICATIONS

U.S. Appl. No. 17/445,774, filed Aug. 24, 2021, 3D Painting on an Eyewear Device.

U.S. Appl. No. 17/410,814, filed Aug. 24, 2021, Media Content Player on an Eyewear Device.

"U.S. Appl. No. 17/410,814, Non Final Office Action dated Jan. 12, 2022", 22 pgs.

"U.S. Appl. No. 17/410,814, Response filed Mar. 30, 2022 to Non Final Office Action dated Jan. 12, 2022", 13 pgs.

"International Application Serial No. PCT/US2021/072959, International Search Report dated Apr. 5, 2022", 5 pgs.

"International Application Serial No. PCT/US2021/072959, Written Opinion dated Apr. 5, 2022", 7 pgs.

"International Application Serial No. PCT/US2021/063350, International Search Report dated Apr. 5, 2022", 4 pgs.

"International Application Serial No. PCT/US2021/063350, Written Opinion dated Apr. 5, 2022", 5 pgs.

\* cited by examiner

US 11,455,078 B1

SPATIAL NAVIGATION AND CREATION INTERFACE

CLAIM OF PRIORITY

This application claims the benefit of priority to U.S. Provisional Application Ser. No. 63/003,057, filed on Mar. 31, 2020, which is incorporated herein by reference in its entirety.

TECHNICAL FIELD

The present disclosure generally relates to the technical field of social networks. In particular, the present embodiments are generally directed to navigating through interfaces of a messaging application.

BACKGROUND

As the popularity of social networking grows, social networks are expanding their capabilities. To improve ease of use, social networks are integrating more and more functions such that a user may accomplish many or even most of their computer-based tasks within the social network itself. One vision of social networks is that they eventually become a virtual operating system, from which a user seldom finds a need to remove themselves.

BRIEF DESCRIPTION OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some embodiments are illustrated by way of example, and not limitation, in the figures of the accompanying drawings in which.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments. It will be evident, however, to those skilled in the art, that embodiments may be practiced without these specific details. In general, well-known instruction instances, protocols, structures, and techniques are not necessarily shown in detail.

Often, users consume media content, and specifically videos, on their mobile device. Such media content is typically exchanged in chat sessions between users. Interacting with such media content is typically done by navigating complex menu structures using multiple inputs. Such navigation on limited user interface devices, such as watches and head-mounted displays, can be tedious, burdensome and inefficient. Specifically, because such user interfaces are limited in the amount and type of content and interactions they provide, additional menus or inputs are needed to reach certain options. For example, a user interface that can only present one option at a time, requires the user to navigate through multiple options on the user interface before reaching an option the user desires to select.

The disclosed embodiments improve the efficiency of using the electronic device by providing a system that leverages multiple types of user inputs to seamlessly and quickly navigate through a complex menu hierarchy. Specifically, according to the disclosed techniques, a messaging application of a user device displays a menu that includes a first set of options relating to a first level in a hierarchy of levels. The menu may be displayed on a limited user interface device, such as a smartwatch or head-mounted display. The messaging application detects, by a touch sensor, one finger touch of a first option of the first set of options and, in response, displays a second set of options related to the first option. The second set of options relates to a second level in the hierarchy of levels. The messaging application detects, by the touch sensor, two finger touch of a second option of the second set of options and, in response, re-displays the first set of options. In this way, the user can quickly and easily switch between options displayed at different levels in a menu hierarchy. This increases the efficiencies of the electronic device by reducing the amount of pages of information and inputs needed to accomplish a task.

Figure 1:
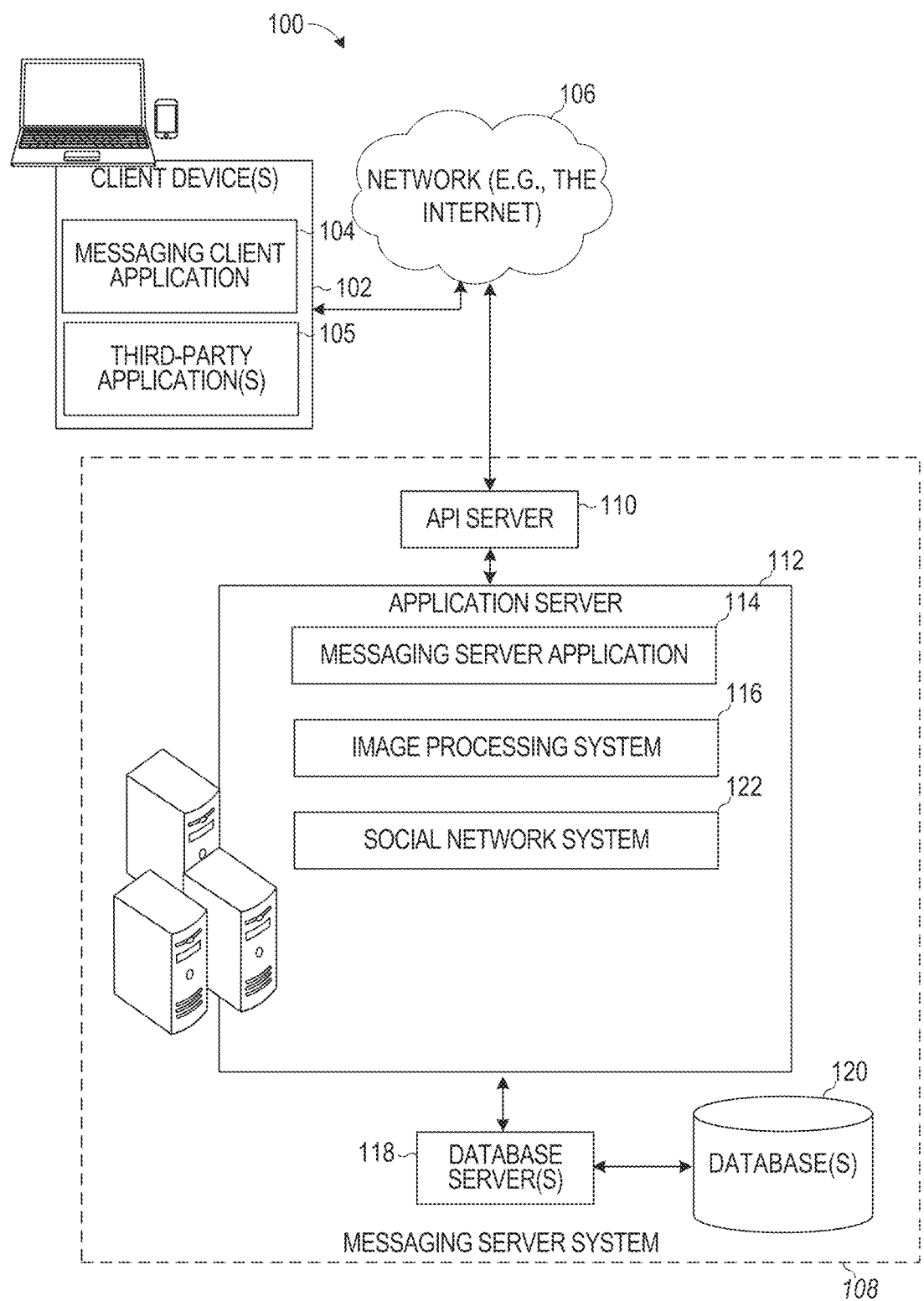
FIG. 1 is a block diagram showing an example messaging system for exchanging data (e.g., messages and associated content) over a network, according to example embodiments.

FIG. 1 is a block diagram showing an example messaging system 100 for exchanging data (e.g., messages and associated content) over a network 106. The messaging system 100 includes multiple client devices 102, each of which hosts a number of applications, including a messaging client application 104 and a third-party application 105. Each messaging client application 104 is communicatively coupled to other instances of the messaging client application 104, the third-party application 105, and a messaging server system 108 via a network 106 (e.g., the Internet).

Accordingly, each messaging client application 104 and third-party application 105 is able to communicate and exchange data with another messaging client application 104 and third-party application(s) 105 and with the messaging server system 108 via the network 106. The data exchanged between messaging client applications 104, third-party applications 105, and the messaging server system 108 includes functions (e.g., commands to invoke functions) and payload data (e.g., text, audio, video, or other multimedia data). Any disclosed communications between the messaging client application 104 and the third-party application(s) 105 can be transmitted directly from the messaging client application 104 to the third-party application(s) 105 or indirectly (e.g., via one or more servers) from the messaging client application 104 to the third-party application(s) 105.

The third-party application(s) 105 and the messaging client application 104 are applications that include a set of functions that allow the client device 102 to access a message storage system 124. The third-party application 105 is an application that is separate and distinct from the messaging client application 104. The third-party application(s) 105 are downloaded and installed by the client device 102 separately from the messaging client application 104. In some implementations, the third-party application(s) 105 are downloaded and installed by the client device 102 before or after the messaging client application 104 is downloaded and installed. The third-party application 105 is an application that is provided by an entity or organization that is different from the entity or organization that provides the messaging client application 104. The third-party application 105 is an application that can be accessed by a client device 102 using separate login credentials than the messaging client application 104. Namely, the third-party application 105 can maintain a first user account and the messaging client application 104 can maintain a second user account. For example, the third-party application 105 can be a social networking application, a dating application, a ride or car sharing application, a shopping application, a trading application, a gaming application, an operating system application (e.g., a push notification application), or an imaging application. Any function pertaining to navigation of a hierarchy of levels of a menu discussed in relation to the messaging client application 104 can be performed also by the third-party application 105.

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include message content, client device information, geolocation information, media annotation and overlays, virtual objects, message content persistence conditions, social network information, and live event information, as examples. Data exchanges within the messaging system 100 are invoked and controlled through functions available via user interfaces (UIs) of the messaging client application 104.

Turning now specifically to the messaging server system 108, an API server 110 is coupled to, and provides a programmatic interface to, an application server 112. The application server 112 is communicatively coupled to a database server 118, which facilitates access to a database 120 in which is stored data associated with messages processed by the application server 112.

Dealing specifically with the API server 110, this server 110 receives and transmits message data (e.g., commands and message payloads) between the client device 102 and the application server 112. Specifically, the API server 110 provides a set of interfaces (e.g., routines and protocols) that can be called or queried by the messaging client application 104 and the third-party application 105 in order to invoke functionality of the application server 112. The API server 110 exposes various functions supported by the application server 112, including account registration; login functionality; the sending of messages, via the application server 112, from a particular messaging client application 104 to another messaging client application 104 or third-party application 105; the sending of media files (e.g., images or video) from a messaging client application 104 to the messaging server application 114, and for possible access by another messaging client application 104 or third-party application 105; the setting of a collection of media data; the retrieval of such collections; the retrieval of a list of friends of a user of a client device 102; the retrieval of messages and content; the adding and deleting of friends to a social graph; the location of friends within a social graph; access to user conversation data; access to avatar information stored on messaging server system 108; and opening an application event (e.g., relating to the messaging client application 104).

The application server 112 hosts a number of applications and subsystems, including a messaging server application 114, an image processing system 116, a social network system 122, and the message storage system 124. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor—and memory-intensive processing of data may also be performed server-side by the messaging server application 114, in view of the hardware requirements for such processing.

The application server 112 also includes an image processing system 116 that is dedicated to performing various image processing operations, typically with respect to images or video received within the payload of a message at the messaging server application 114. A portion of the image processing system 116 may also be implemented by the message storage system 124.

The social network system 122 supports various social networking functions and services and makes these functions and services available to the messaging server application 114. To this end, the social network system 122 maintains and accesses an entity graph within the database 120. Examples of functions and services supported by the social network system 122 include the identification of other users of the messaging system 100 with which a particular user has relationships or is "following" and also the identification of other entities and interests of a particular user. Such other users may be referred to as the user's friends. Social network system 122 may access location information associated with each of the user's friends to determine where they live or are currently located geographically. Social network system 122 may maintain a location profile for each of the user's friends indicating the geographical location where the user's friends live.

The application server 112 is communicatively coupled to a database server 118, which facilitates access to a database 120 in which is stored data associated with messages processed by the messaging server application 114. Database 120 may be a third-party database. For example, the application server 112 may be associated with a first entity, and the database 120 or a portion of the database 120 may be associated with and hosted by a second, different entity. In some implementations, database 120 stores user data that the first entity collects about various each of the users of a service provided by the first entity. For example, the user data includes user names, passwords, addresses, friends, activity information, preferences, videos or content consumed by the user, and so forth.

In some embodiments, the messaging client application 104 enables a user to navigate through a hierarchy of levels of a menu using various touch inputs. For example, the messaging client application 104 presents a first level of the hierarchy of levels on a touch screen display that includes a first set of options. The messaging client application 104 may detect a single or one finger touch at a location corresponding to a first option of the first set of options of the first level. In response, the messaging client application 104 displays a second level of the hierarchy of levels that includes a set of options corresponding to the first option. The second level may be displayed in replacement of the first level in which case the first set of options are removed from the display and the second set of options are displayed at the same or substantially the same location as the first set of options. In some cases, the second set of options are presented above or below or adjacent to the first set of options, such that both the first and second sets of options are displayed simultaneously. Any touch input received from the user when the second set of options are displayed is associated with and navigates through the second set of options.

The messaging client application 104 may receive a two-finger or multi-finger touch of a second option that is included in the second set of options. In some cases, the two-finger touch input may be received at any other suitable location on the display screen or input interface. In response, the messaging client application 104 navigates back to the first level of the hierarchy of levels to display the first set of options again. In some cases, the first set of options replaces the display of the second set of options. In cases where the first and second sets of options are simultaneously displayed, the second set of options is removed from the display and navigation returns to the first set of options. Namely, any input received subsequent to the two-finger touch is associated with the first level of the hierarchy (e.g., the first set of options). In this way, a user can quickly and easily navigate up sequential levels of the hierarchy by providing a one-finger touch of respective options of the levels of the hierarchy that are presented and can quickly and easily navigate back down sequential levels of the hierarchy by providing a two-finger touch of a particular option or anywhere on the screen.

While the second set of options are presented that are part of the second level of the hierarchy, the messaging client application 104 may receive a one-finger touch of a third option in the second set of options. The messaging client application 104 may determine whether a third level of the hierarchy is available for the third option that includes a third set of options. If the third level is available for the third option, the messaging client application 104 navigates the user to the third level of the hierarchy and replaces the second level of the hierarchy or presents the third set of options adjacent to the first and second sets of options. If the third level is not available for the third option, the messaging client application 104 activates a function corresponding to the third option, and automatically navigates the user back to the first level of the hierarchy.

In some cases, each level of the hierarchy can be presented on a non-touchscreen display and a touch sensor coupled to the non-touchscreen display may receive touch input from a user to enable navigation through the hierarchy of levels. For example, the display may be provided on lenses of glasses and the touch sensor may be placed on the frame of the glasses and is configured to receive touch input from a user when a user touches the frame of the glasses at a particular point with one or two fingers. The user can drag the finger across the frame to perform a touch and slide operation.

The messaging client application 104 enables a user to quickly and easily navigate to a next level of a hierarchy of levels and select an option in the next level and then return back to the original level of the hierarchy without lifting the user's finger from the touch sensor. As an example, a first level of a hierarchy of levels is presented in which the first set of options is presented. The messaging client application 104 may detect a one-finger touch and hold input over a given option of the first set of options. For example, the user may touch an area of the touch sensor corresponding to the given option with one finger and may keep that finger positioned and placed on the touch sensor for a threshold period of time without moving the finger (e.g., for 2 seconds) to provide the touch and hold input. In response, the messaging client application 104 presents a second level of the hierarchy with a second set of options corresponding to the given option. In some cases, the second set of options includes multiple individual options that can be selected or a slider that enables sequential adjustment of a parameter. As mentioned previously, the second set of options may be presented in replacement of the first set of options or adjacent to the first set of options. Without lifting the user's finger after providing the touch and hold input, the user can slide (swipe) the finger across the display or touch sensor (e.g., left and right). As the user slides (swipes) the finger, different respective ones of the options displayed as part of the second set of options are indicated for selection or the slider is moved to new positions left/right corresponding to movement of the finger across the display or touch sensor. When the option of the second set of options is indicated for selection that is of interest to the user, the user can lift the finger to cause the indicated option to be selected and to automatically return to the first level of the hierarchy. In this way, the user can, with a combination of gestures using a single finger touch (touch and hold, slide, and removing or releasing the finger) can navigate to a next level of the hierarchy (e.g., level 2), select an option of interest, and return to the previous level of the hierarchy (e.g., level 1).

The messaging client application 104 enables a user to quickly and easily navigate to a previous level of a hierarchy of levels and select an option in the previous level and then return back to the original level of the hierarchy without lifting the user's finger from the touch sensor. As an example, a second level of a hierarchy of levels is presented in which the second set of options is presented. The messaging client application 104 may detect a two-finger touch and hold input over a given option of the second set of options. For example, the user may touch an area of the touch sensor corresponding to the given option with two fingers and may keep those fingers positioned and placed on the touch sensor for a threshold period of time without moving the fingers (e.g., for 2 seconds) to provide the two-finger touch and hold input. In response, the messaging client application 104 returns to presenting and enabling navigation through the first level of the hierarchy with the first set of options. In some cases, the first set of options includes multiple individual options that can be selected or a slider that enables sequential adjustment of a parameter. As mentioned previously, the first set of options may be presented in replacement of the second set of options or adjacent to the second set of options. Without lifting the user's two-fingers after providing the two-finger touch and hold input, the user can slide (swipe) the two fingers across the display or touch sensor (e.g., left and right). As the user slides (swipes) the two-fingers, different respective ones of the options displayed as part of the first set of options are indicated for selection or the slider is moved to new positions left/right corresponding to movement of the two fingers across the display or touch sensor. When the option of the first set of options is indicated for selection that is of interest to the user, the user can lift the two fingers to cause the indicated option to be selected and to automatically return to the second level of the hierarchy. In this way, the user can, with a combination of gestures using a single touch with two fingers (touch and hold, slide, and removing or release the two fingers) can navigate to a previous level of the hierarchy (e.g., level 1 from level 2 or to level 1 from level 3 skipping over level 2), select an option of interest, and return to the next level of the hierarchy (e.g., level 2).

Figure 2:
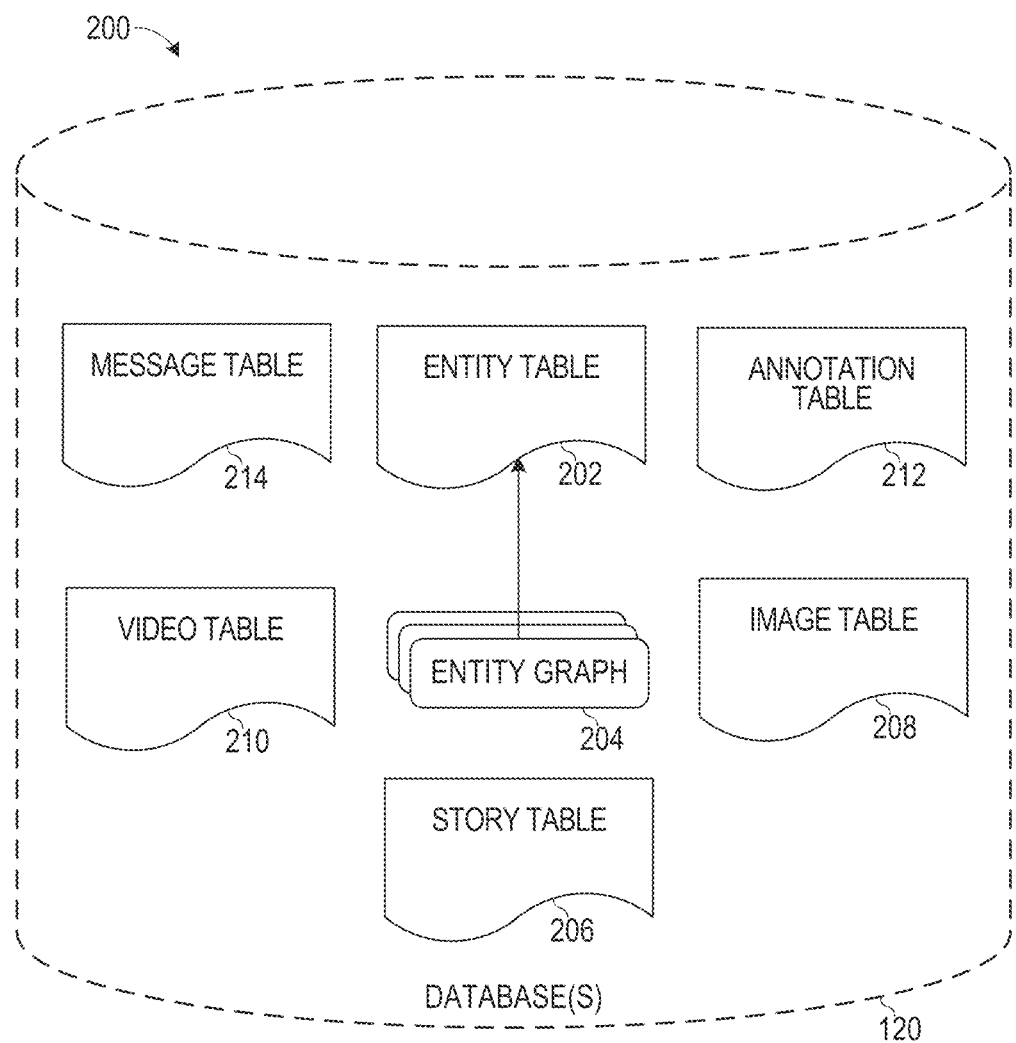
FIG. 2 is a schematic diagram illustrating data which may be stored in the database of a messaging server system, according to example embodiments.

FIG. 2 is a schematic diagram 200 illustrating data, which may be stored in the database 120 of the messaging server system 108, according to certain example embodiments. While the content of the database 120 is shown to comprise a number of tables, it will be appreciated that the data could be stored in other types of data structures (e.g., as an object-oriented database).

The database 120 includes message data stored within a message table 214. An entity table 202 stores entity data, including an entity graph 204. Entities for which records are maintained within the entity table 202 may include individuals, corporate entities, organizations, objects, places, events, and so forth. Regardless of type, any entity regarding which the messaging server system 108 stores data may be a recognized entity. Each entity is provided with a unique identifier, as well as an entity type identifier (not shown).

The entity graph 204 stores information regarding relationships and associations between entities. Such relationships may be social, professional (e.g., work at a common corporation or organization), interest-based, or activity-based, merely for example.

Message table 214 may store a collection of conversations between a user and one or more friends or entities. Message table 214 may include various attributes of each conversation, such as the list of participants, the size of the conversation (e.g., number of users and/or number of messages), the chat color of the conversation, a unique identifier for the conversation, and any other conversation related feature(s).

The database 120 also stores annotation data, in the example form of filters, in an annotation table 212. Database 120 also stores annotated content received in the annotation table 212. Filters for which data is stored within the annotation table 212 are associated with and applied to videos (for which data is stored in a video table 210) and/or images (for which data is stored in an image table 208). Filters, in one example, are overlays that are displayed as overlaid on an image or video during presentation to a recipient user. Filters may be of various types, including user-selected filters from a gallery of filters presented to a sending user by the messaging client application 104 when the sending user is composing a message. Other types of filters include geolocation filters (also known as geo-filters), which may be presented to a sending user based on geographic location. For example, geolocation filters specific to a neighborhood or special location may be presented within a UI by the messaging client application 104, based on geolocation information determined by a Global Positioning System (GPS) unit of the client device 102. Another type of filter is a data filter, which may be selectively presented to a sending user by the messaging client application 104, based on other inputs or information gathered by the client device 102 during the message creation process. Examples of data filters include current temperature at a specific location, a current speed at which a sending user is traveling, battery life for a client device 102, or the current time.

Other annotation data that may be stored within the image table 208 is so-called "lens" data. A "lens" may be a real-time special effect and sound that may be added to an image or a video.

As mentioned above, the video table 210 stores video data which, in one embodiment, is associated with messages for which records are maintained within the message table 214. Similarly, the image table 208 stores image data associated with messages for which message data is stored in the entity table 202. The entity table 202 may associate various annotations from the annotation table 212 with various images and videos stored in the image table 208 and the video table 210.

A story table 206 stores data regarding collections of messages and associated image, video, or audio data, which are compiled into a collection (e.g., a story or a gallery). The creation of a particular collection may be initiated by a particular user (e.g., each user for which a record is maintained in the entity table 202). A user may create a "personal story" in the form of a collection of content that has been created and sent/broadcast by that user. To this end, the UI of the messaging client application 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices 102 have location services enabled and are at a common location event at a particular time may, for example, be presented with an option, via a UI of the messaging client application 104, to contribute content to a particular live story. The live story may be identified to the user by the messaging client application 104 based on his or her location. The end result is a "live story" told from a community perspective.

A further type of content collection is known as a "location story," which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Figure 3:
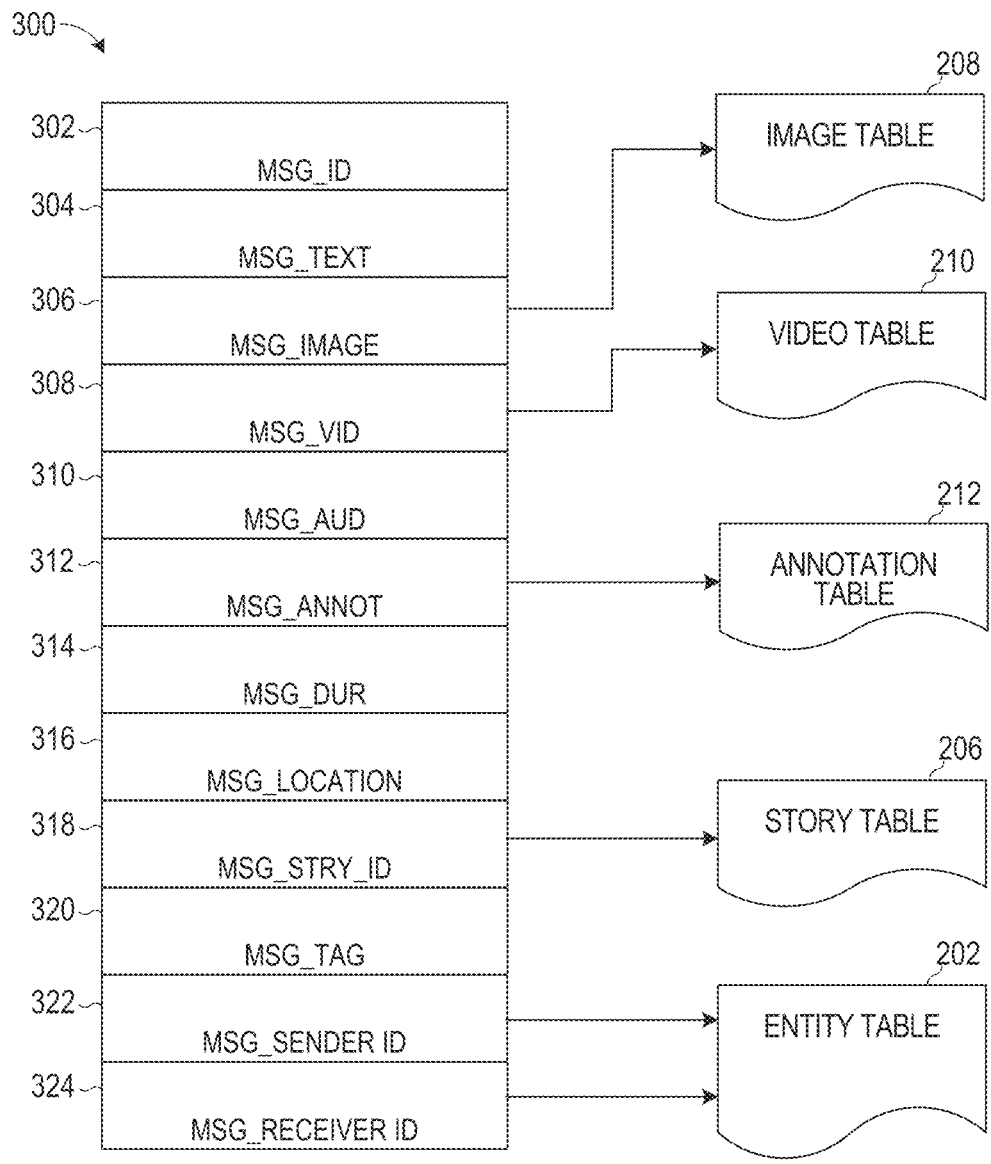
FIG. 3 is a schematic diagram illustrating a structure of a message generated by a messaging client application for communication, according to example embodiments.

FIG. 3 is a schematic diagram illustrating a structure of a message 300, according to some embodiments, generated by a messaging client application 104 for communication to a further messaging client application 104 or the messaging server application 114. The content of a particular message 300 is used to populate the message table 214 stored within the database 120, accessible by the messaging server application 114. Similarly, the content of a message 300 is stored in memory as "in-transit" or "in-flight" data of the client device 102 or the application server 112. The message 300 is shown to include the following components:

A message identifier 302: a unique identifier that identifies the message 300.

A message text payload 304: text, to be generated by a user via a UI of the client device 102 and that is included in the message 300.

A message image payload 306: image data, captured by a camera component of a client device 102 or retrieved from memory of a client device 102, and that is included in the message 300.

A message video payload 308: video data, captured by a camera component or retrieved from a memory component of the client device 102 and that is included in the message 300.

A message audio payload 310: audio data, captured by a microphone or retrieved from the memory component of the client device 102, and that is included in the message 300.

Message annotations 312: annotation data (e.g., filters, stickers, or other enhancements) that represents annotations to be applied to message image payload 306, message video payload 308, or message audio payload 310 of the message 300.

A message duration parameter 314: parameter value indicating, in seconds, the amount of time for which content of the message (e.g., the message image payload 306, message video payload 308, message audio payload 310) is to be presented or made accessible to a user via the messaging client application 104.

A message geolocation parameter 316: geolocation data (e.g., latitudinal and longitudinal coordinates) associated with the content payload of the message. Multiple message geolocation parameter 316 values may be included in the payload, with each of these parameter values being associated with respect to content items included in the content (e.g., a specific image within the message image payload 306, or a specific video in the message video payload 308).

A message story identifier 318: identifier value identifying one or more content collections (e.g., "stories") with which a particular content item in the message image payload 306 of the message 300 is associated. For example, multiple images within the message image payload 306 may each be associated with multiple content collections using identifier values.

A message tag 320: each message 300 may be tagged with multiple tags, each of which is indicative of the subject matter of content included in the message payload. For example, where a particular image included in the message image payload 306 depicts an animal (e.g., a lion), a tag value may be included within the message tag 320 that is indicative of the relevant animal. Tag values may be generated manually, based on user input, or may be automatically generated using, for example, image recognition.

A message sender identifier 322: an identifier (e.g., a messaging system identifier, email address, or device identifier) indicative of a user of the client device 102 on which the message 300 was generated and from which the message 300 was sent.

A message receiver identifier 324: an identifier (e.g., a messaging system identifier, email address, or device identifier) indicative of user(s) of the client device 102 to which the message 300 is addressed. In the case of a conversation between multiple users, the identifier may indicate each user involved in the conversation.

The contents (e.g., values) of the various components of message 300 may be pointers to locations in tables within which content data values are stored. For example, an image value in the message image payload 306 may be a pointer to (or address of) a location within an image table 208. Similarly, values within the message video payload 308 may point to data stored within a video table 210, values stored within the message annotations 312 may point to data stored in an annotation table 212, values stored within the message story identifier 318 may point to data stored in a story table 206, and values stored within the message sender identifier 322 and the message receiver identifier 324 may point to user records stored within an entity table 202.

Figure 4:
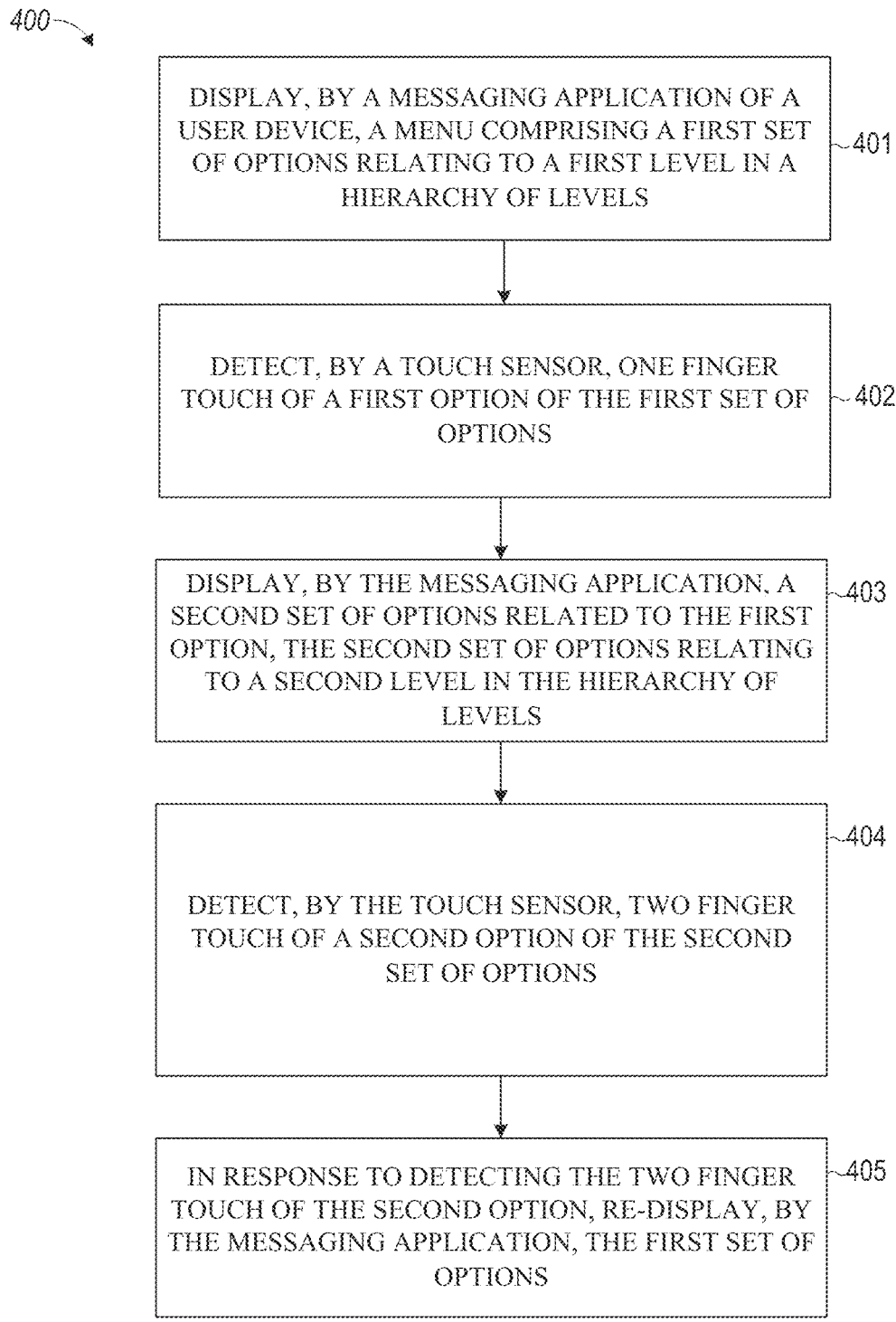
FIG. 4 is a flowchart illustrating example operations of the messaging client application, according to example embodiments.

FIG. 4 is a flowchart illustrating example operations of the messaging client application 104 in performing process 400, according to example embodiments. The process 400 may be embodied in computer-readable instructions for execution by one or more processors such that the operations of the process 400 may be performed in part or in whole by the functional components of the messaging server system 108, client device 102, third-party application 105, or the messaging client application 104; accordingly, the process 400 is described below by way of example with reference thereto. However, in other embodiments, at least some of the operations of the process 400 may be deployed on various other hardware configurations. The process 400 is therefore not intended to be limited to the messaging client application 104 and can be implemented in whole, or in part, by any other component. Some or all of the operations of process 500 can be in parallel, out of order, or entirely omitted.

At operation 401, a computing device (e.g., client device 102 implementing the messaging client application 104) displays a menu comprising a first set of options relating to a first level in a hierarchy of levels. For example, as shown in reference to FIG. 5, the messaging client application 104 presents a first level 501 (e.g., level 0) of the hierarchy of levels 500. The first level 501 includes a first set of options (represented by respective dots in the drawing).

Figure 5:
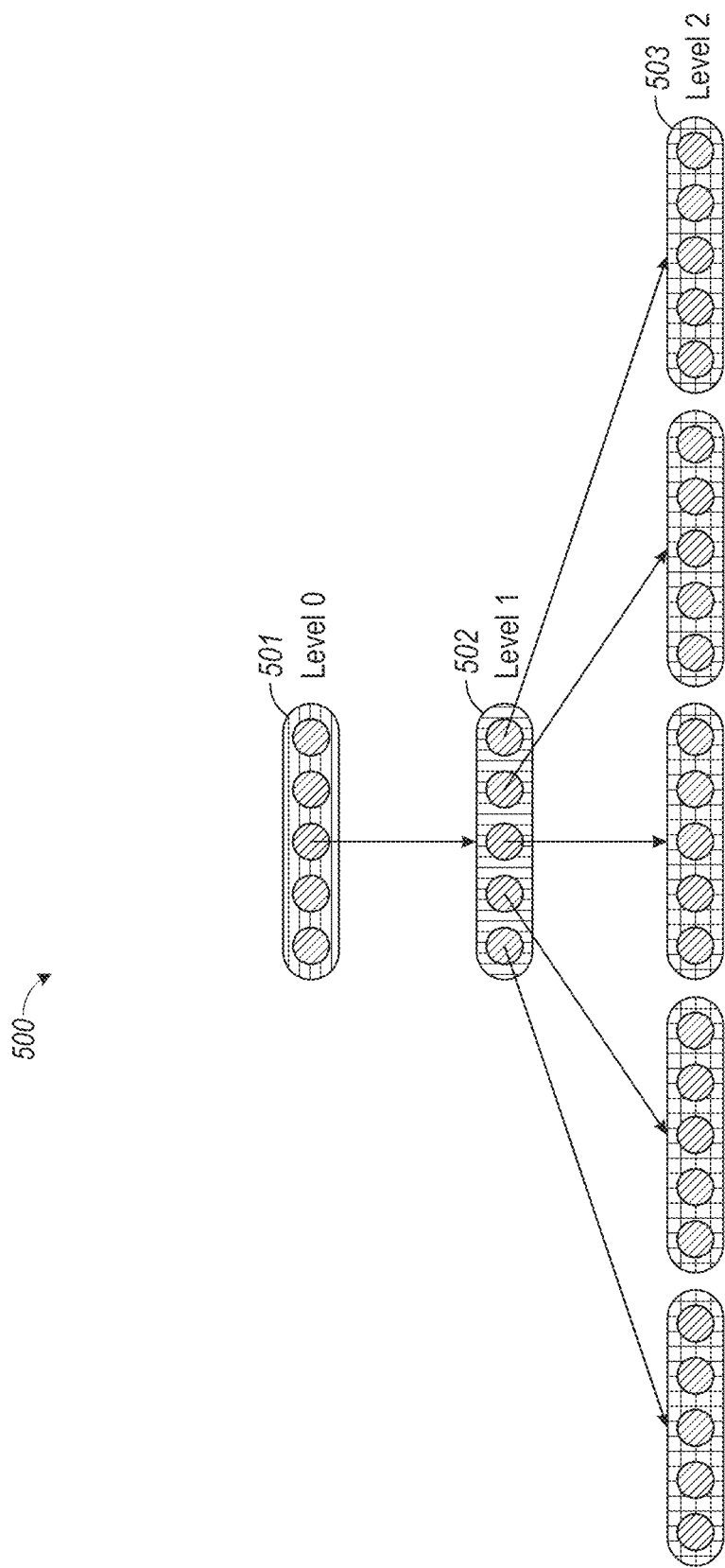
FIG. 5 is an illustrative example of a hierarchy of levels of a menu of the messaging client application, according to example embodiments.

At operation 402, the computing device detects, by a touch sensor, one finger touch of a first option of the first set of options. For example, as shown in FIG. 5, the messaging client application 104 receives a one finger touch input (e.g., using a touch sensor integrated with the touchscreen on which the options are displayed or associated with a non-touchscreen on which the options are displayed) of an option in the first level 501. In an example, the user selects the middle third option in the first level 501.

At operation 403, the computing device displays a second set of options related to the first option. The second set of options relates to a second level of the hierarchy of levels. For example, as shown in reference to FIG. 5, the messaging client application 104 presents a second level 503 (e.g., level 1) of the hierarchy of levels 500. The second level 501 includes a first set of options (represented by respective dots in the drawing) that correspond to the middle third option in the first level 501 selected using the one finger touch by the user.

At operation 404, the computing device detects, by the touch sensor, two finger touch of a second option of the second set of options. For example, as shown in FIG. 5, the messaging client application 104 receives a two finger touch input (e.g., using a touch sensor integrated with the touchscreen on which the options are displayed or associated with a non-touchscreen on which the options are displayed) of an option in the second level 502 or anywhere on the screen.

At operation 405 the computing device in response to detecting the two finger touch of the second option, re-displays the first set of options. For example, as shown in reference to FIG. 5, the messaging client application 104 re-presents the first level 501 (e.g., level 0) of the hierarchy of levels 500.

As shown in FIG. 5, the messaging client application 104 enables a user to quickly and easily navigate through the illustrative hierarchy of levels 500 of a menu. The hierarchy of levels 500 includes a first level 501, a second level 502 and a third level 503. Each subsequent level includes options corresponding to a given option selected in the previous level.

In one example, the hierarchy of levels 500 corresponds to types of image modification options. For example, the first level 501 includes a first set of options that each modifies an image or video in a different manner. The first set of options includes any one or more of an option to add a three-dimensional (3D) caption to an image or video, an option to add a two-dimensional caption to an image or video, an option to paint/draw over an image or video, an option to apply a filter to the image, or an option to apply graphical elements (e.g., augmented reality items) to an image or video. The second level 502 includes a second set of options corresponding to each one of the first sets of options.

As an example, if the option to add a 3D caption to the image or video from the first level 501 is selected, the second set of options in the second level 502 includes any one or more of an option to adjust a size of the text, an option to adjust a position of the text, an option to adjust the font style of the text, or an option to adjust a color of the text. The third level 503 includes a third set of options corresponding to each one of the second sets of options. As an example, if the option to adjust the position of the text from the second level 502 is selected, the third set of options includes a 3D slider that allows a user to swipe the finger up/down/left/right to change the position of the 3D caption over the image or video. Once the desired position is selected (e.g., after the user releases the finger from the display after swiping in the desired direction), the messaging client application 104 automatically presents the second level 502. Next, the user can press and hold one finger over the option to adjust a color of the text from the second level 502, and in response, the messaging client application 104 presents, as the third level 503, a slider that allows a user to slide the finger left/right to change the color of the 3D caption. Without releasing the finger from the press and hold operation, the user slides the finger left and right to change the color of the 3D caption. The 3D caption displayed over the image or video changes color as the user slides the finger and when the user releases the finger, the 3D caption retains the last color selected by the user and the messaging client application 104 re-displays the second level 502.

Figure 6:
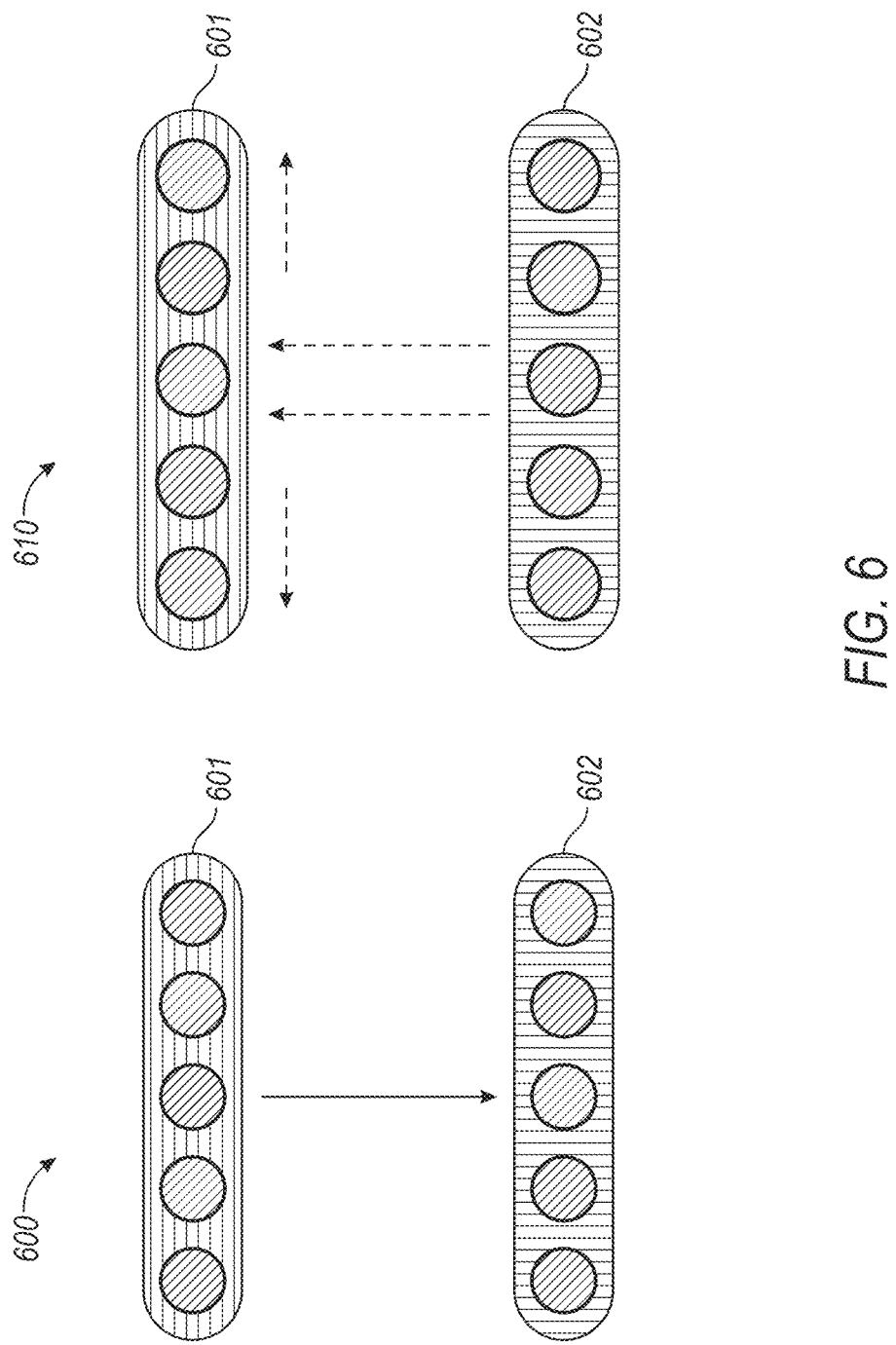
FIGS. 6 and 7A-C show illustrative inputs and outputs of the messaging client application, according to example embodiments.
Figure 7A:
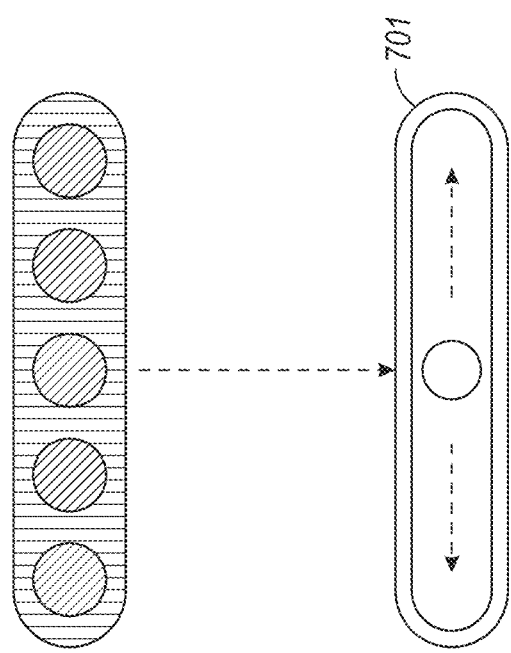

As shown in FIG. 6, an interface 600 for using a one-finger touch to navigate the hierarchy of levels is shown. Specifically, a first level 601 of the hierarchy of levels 500 is presented to the user. A one finger touch is detected over one of the options included in the first level 601 and in response, a second level 602 of the hierarchy of levels 500 is presented. In some cases, the one finger touch is a touch and hold operation. In response, as shown in FIG. 7A, a set of options 701 (e.g., a slider) is presented. The user can swipe left/right across the options in the set of options 701 and when the user releases the one finger (to end the one finger touch and hold operation), the first level 601 is re-resented to the user Interface 610 shown in FIG. 6 illustrates a two-finger touch to navigate the hierarchy of levels. Specifically, after the second level 602 of the hierarchy of levels 500 of FIG. 5 is presented to the user, a two-finger touch is received. In response, the first level 601 of the hierarchy of levels 500 is re-presented. If the two-finger touch is a touch and hold operation, the user can swipe left/right across the options in the first level 601 and when the user releases the two-fingers, the second level 602 is re-presented to the user.

While the second level 502 is presented, the user can touch and hold two-fingers over a given option in the second level. Without releasing the user's fingers, the messaging client application 104 re-presents the first level 501 in which the first set of options are presented. The user can slide the two fingers over another option (e.g., the option to add a filter to the image or video). When the user releases the two fingers, the messaging client application 104 automatically retrieves and displays, as the second level 502, a set of options corresponding to adding a filter to the image or video. For example, the second set of options includes different types of filters. The user can select a given type of filter from the second set of options. In response, the third level 503 is presented with options to modify parameters of the given type of filter selected from the second level 502. For example, the third level 503 includes options to modify the color, size, pattern or style of the given type of filter.

In one example, the hierarchy of levels 500 corresponds to types of map options. For example, the first level 501 includes a first set of options that each selects a type of map operation. The first set of options includes any one or more of an option to search for a destination, an option to navigate to a destination, an option to search for nearby locations, and an option to modify layers of the map. The second level 502 includes a second set of options corresponding to each one of the first sets of options.

As an example, if the option to navigate to a destination from the first level 501 is selected, the second set of options in the second level 502 includes any one or more of an option to input an address or an option to select a transportation mode. The third level 503 includes a third set of options corresponding to each one of the second sets of options. As an example, if the option to select a transportation mode from the second level 502 is selected, the third set of options includes a set of options including one or more of a train option, a bus option, or a car option. Once the desired position is selected (e.g., after the user releases the finger from the display after tapping on the desired transportation mode), the messaging client application 104 automatically presents the second level 502. Next, the user can press and hold one finger over the option to input an address from the second level 502, and in response the messaging client application 104 presents, as the third level 503, a slider that allows a user to slide the finger left/right to select between previously stored destinations. Without releasing the finger from the press and hold operation, the user slides the finger left and right to a desired destination. When the user releases the finger, the messaging client application 104 provides directions to the selected destination according to the selected transportation mode.

In one example, the hierarchy of levels 500 corresponds to types of media playback options. For example, the first level 501 includes a first set of options that each adjusts playback in a different way. The first set of options includes any one or more of an option to select a series, an option to adjust volume, an option to control a transport bar, or an option to adjust frame skipping operations. The second level 502 includes a second set of options corresponding to each one of the first sets of options.

As an example, if the option to select a series from the first level 501 is selected, the second set of options in the second level 502 includes identifiers of various series that the user may be interested in. The third level 503 includes a third set of options corresponding to each one of the first sets of options. As an example, if a first series is selected from the second level 502, the third set of options includes a list of various episodes of the first series. Once the desired episode is selected, the messaging client application 104 automatically plays the selected episode. If the option to adjust frame skipping operations from the first level 501 is selected, the second set of options in the second level 502 includes one or more of a fast forward operation, a rewind operation, a next episode operation, a previous episode operation, and so forth. The user can select one of the options from the second level 502 to modify the playback of the media asset (e.g., modify playback of the episode previous selected from the third level 503.

In one example, the hierarchy of levels 500 corresponds to types of phone/video call options. For example, the first level 501 includes a first set of options that each selects a different mode of communication. The first set of options includes any one or more of an option to send a video message, an option to start a phone call, an option to start a single chat, an option to start a group chat, an option to start a video call, and so forth. The second level 502 includes a second set of options corresponding to each one of the first sets of options.

As an example, if the option to place a phone call from the first level 501 is selected, the second set of options in the second level 502 includes identifiers of recent contacts for the user. The user can select a contact from the second level 502 to initiate a phone call to the selected contact. As an example, the user can touch and hold the option to place a phone call from the first level, in response a list of contacts is presented. Without the user releasing the finger from the touch and hold operation, the user can swipe to a desired contact, and when the user releases the finger, a call is initiated to the desired contact.

In one example, the hierarchy of levels 500 corresponds to types of system navigation options. For example, the first level 501 includes a first set of options that each modifies a different operating system parameter. The first set of options includes any one or more of an option to select an application to launch, a load/swap option, an option to view battery, cellular/Wi-Fi connection, or time, or an option to activate gesture inputs. The second level 502 includes a second set of options corresponding to each one of the first sets of options.

As an example, if the option to launch an application from the first level 501 is selected, the second set of options in the second level 502 includes a list of different applications that are installed on the client device 102. The user can tap or swipe to a given application in the list to cause the application to be launched.

Figure 7B:
Figure 7B:
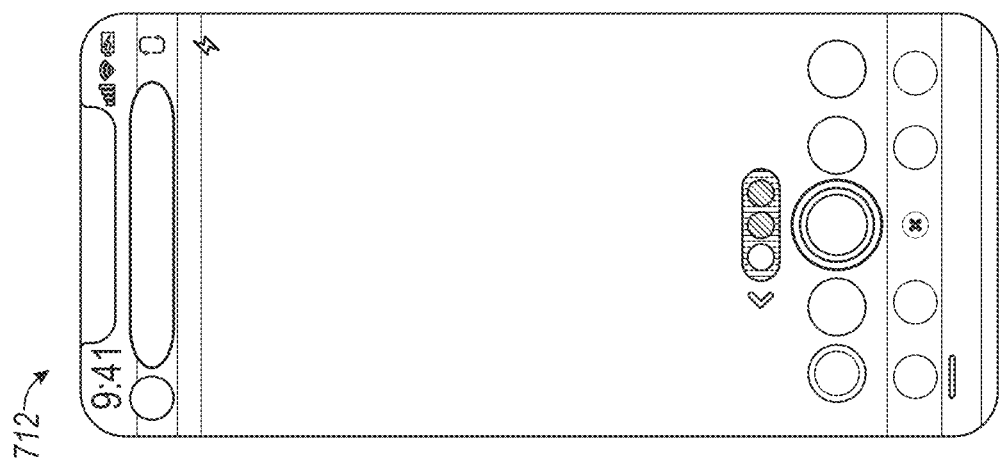
Figure 7B:
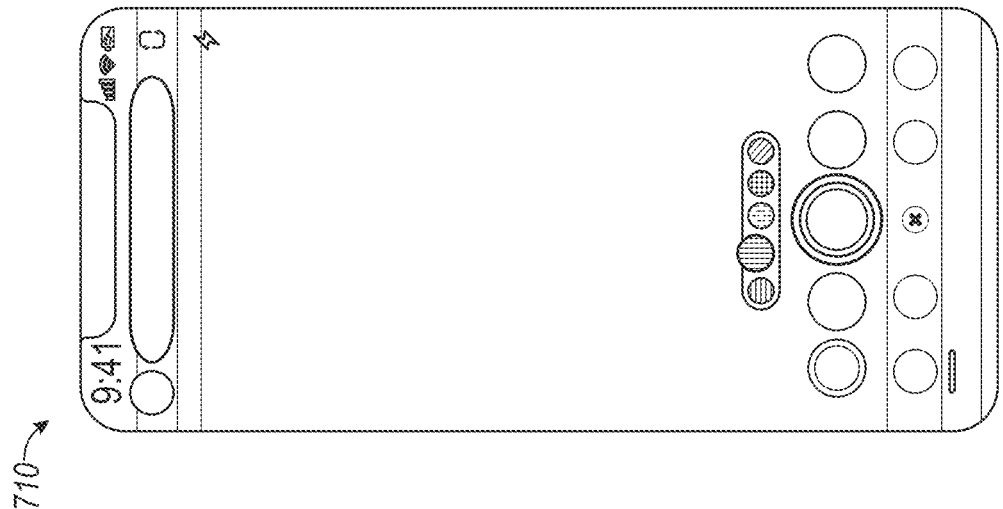

FIG. 7B illustrates a graphical user interface for navigating through a menu hierarchy using touch input, according to example embodiments. The messaging client application 104 presents on a first interface 710 a first set of options corresponding to a first level of a hierarchy. The messaging client application 104 receives a one finger touch of a given one of the first set of options illustrated by increasing a size of the selected option relative to the other options in the first set of options. In response, the messaging client application 104 presents a second interface 720 in which a second set of options is shown. The second set of options corresponds to a second level of the hierarchy and corresponds to the option selected from the first set of options shown in the first interface 710. The user can use one finger to touch and hold one of the options in the second set of options shown in second interface 720. In response, the messaging client application 104 determines that a parameter adjustment is in the third level of the hierarchy corresponding to the selected option from the second set of options. As a result, the messaging client application 104 presents a slider in the third interface 714 that allows the user to adjust the parameter by swiping the finger left/right without having lifted or released the finger after the initial touch and hold operation. Once the slider is placed in a desired location to make the desired parameter adjustment, the user can release the finger to end the touch and hold operation and, in response, the messaging client application 104 re-presents the second set of options in the second interface 712.

Figure 7C:
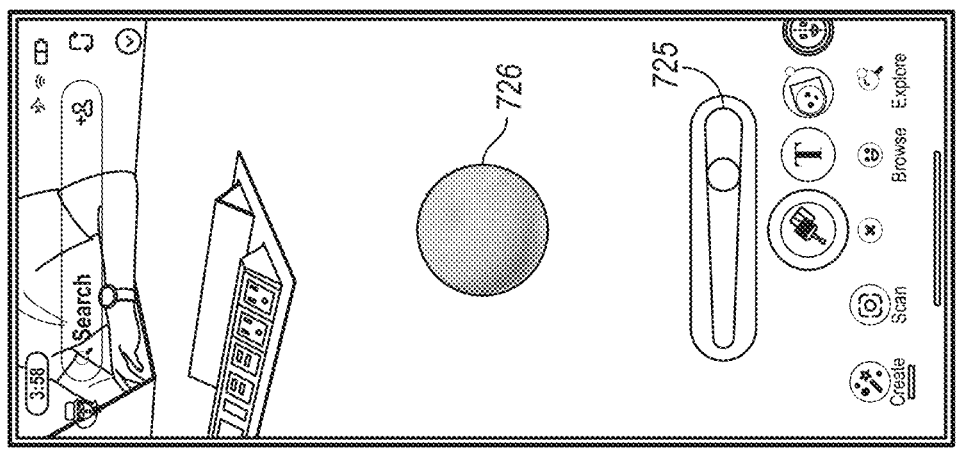
Figure 7C:
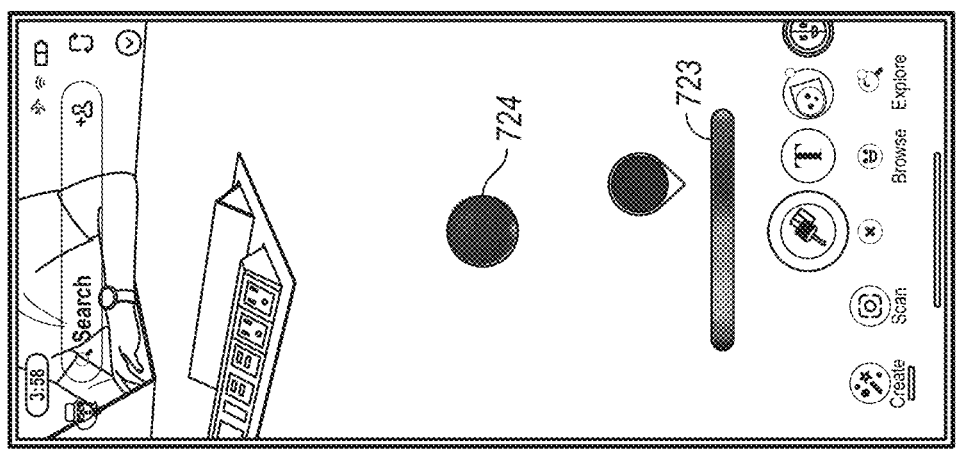
Figure 7C:
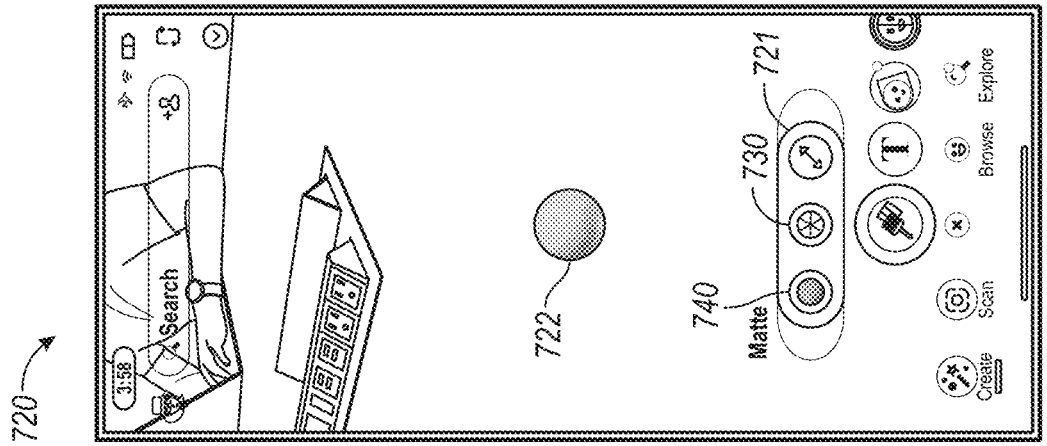

FIG. 7C illustrates a graphical user interface 720 for adding a graphical element to enhance or augment an image or video that is displayed using touch input, according to example embodiments. Specifically, the messaging client application 104 presents a first set of options corresponding to a first level of a hierarchy from which the user selected an option to paint over an image or video. In response, the messaging client application 104 presents a graphical indicator 722 that represents the type of brush style and paint color that will be used to paint over the image or video. The user can place the finger over the image or video and drag the finger around to paint freestyle using the represented type of brush style and paint color. After the option to paint is selected from the first level, the messaging client application 104 presents a second set of options 721 corresponding to a second level of the hierarchy. The second set of options 721 includes a color option 740 and a size option 730.

The user may press and hold one finger to initiate a one finger touch and hold operation over the color option 740. In response, the messaging client application 104 presents a third level of the hierarchy as a slider 723. The user can swipe left and right to move the slider to a desired color. The desired color changes as the user swipes the finger left and right and is shown by updating the indicator 724 to represent the selected color. Once the user releases the finger from the slider 723 to end the touch and hold operation, the messaging client application 104 re-presents the second set of options 721.

The user may tap with one finger the size option 730 in the second set of options 721. In response, the messaging client application 104 presents a third level of the hierarchy as a slider 725. The user can swipe left and right to move the slider to a desired size. The desired size changes as the user swipes the finger left and right and is shown by updating the size of indicator 726 to represent the selected size. Once the user is satisfied with the size that will be used for the paintbrush, the user can tap the screen using two fingers to return to the previous level of the hierarchy. In response, the messaging client application 104 re-presents the second set of options 721.

Figure 8:
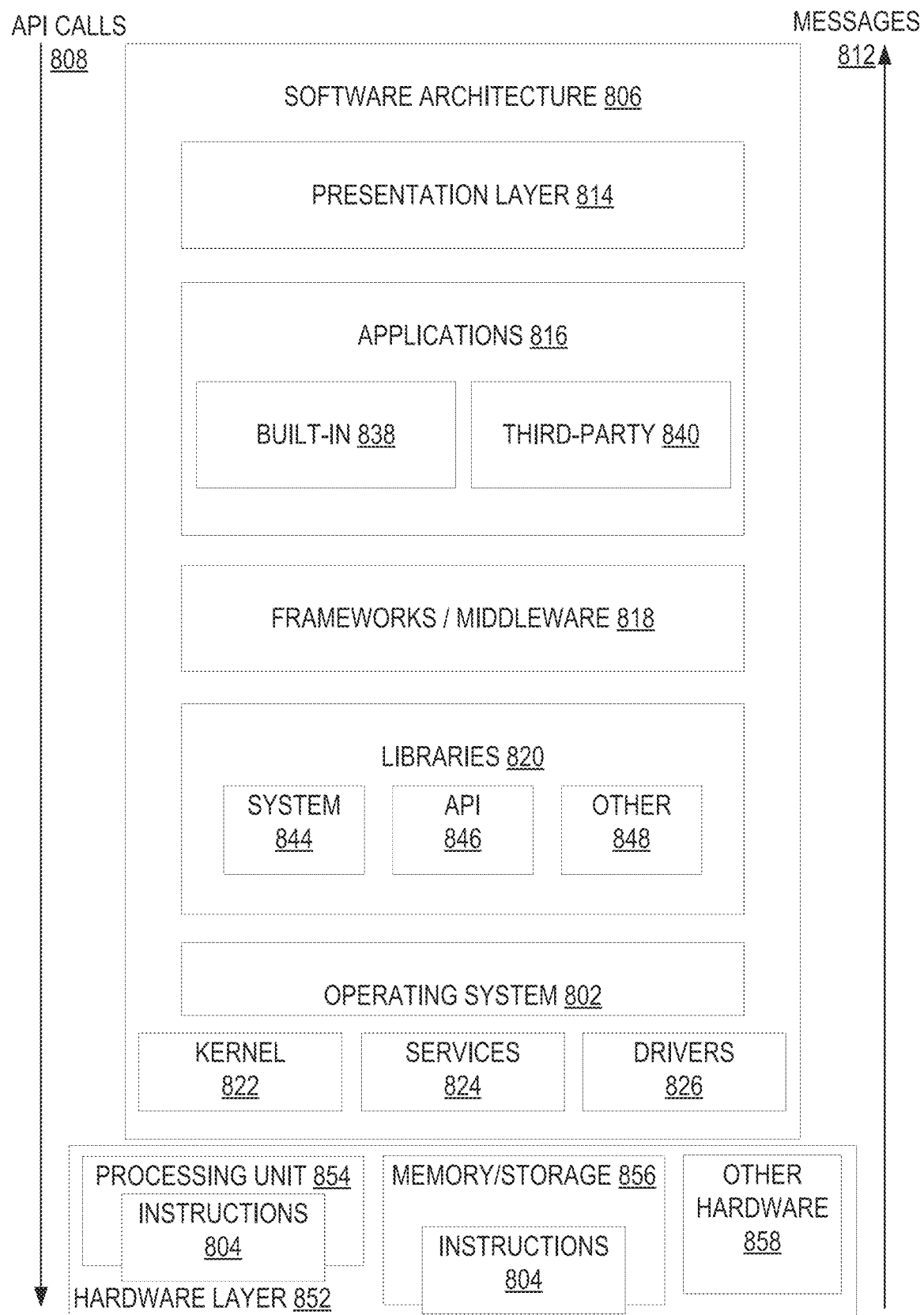
FIG. 8 is a block diagram illustrating a representative software architecture, which may be used in conjunction with various hardware architectures herein described, according to example embodiments.

FIG. 8 is a block diagram illustrating an example software architecture 806, which may be used in conjunction with various hardware architectures herein described. FIG. 8 is a non-limiting example of a software architecture and it will be appreciated that many other architectures may be implemented to facilitate the functionality described herein. The software architecture 806 may execute on hardware such as machine 900 of FIG. 9 that includes, among other things, processors 904, memory 914, and input/output (I/O) components 918. A representative hardware layer 852 is illustrated and can represent, for example, the machine 900 of FIG. 9. The representative hardware layer 852 includes a processing unit 854 having associated executable instructions 804. Executable instructions 804 represent the executable instructions of the software architecture 806, including implementation of the methods, components, and so forth described herein. The hardware layer 852 also includes memory and/or storage modules memory/storage 856, which also have executable instructions 804. The hardware layer 852 may also comprise other hardware 858.

In the example architecture of FIG. 8, the software architecture 806 may be conceptualized as a stack of layers where each layer provides particular functionality. For example, the software architecture 806 may include layers such as an operating system 802, libraries 820, frameworks/middleware 818, applications 816, and a presentation layer 814. Operationally, the applications 816 and/or other components within the layers may invoke API calls 808 through the software stack and receive messages 812 in response to the API calls 808. The layers illustrated are representative in nature and not all software architectures have all layers. For example, some mobile or special purpose operating systems may not provide a frameworks/middleware 818, while others may provide such a layer. Other software architectures may include additional or different layers.

The operating system 802 may manage hardware resources and provide common services. The operating system 802 may include, for example, a kernel 822, services 824, and drivers 826. The kernel 822 may act as an abstraction layer between the hardware and the other software layers. For example, the kernel 822 may be responsible for memory management, processor management (e.g., scheduling), component management, networking, security settings, and so on. The services 824 may provide other common services for the other software layers. The drivers 826 are responsible for controlling or interfacing with the underlying hardware. For instance, the drivers 826 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 820 provide a common infrastructure that is used by the applications 816 and/or other components and/or layers. The libraries 820 provide functionality that allows other software components to perform tasks in an easier fashion than to interface directly with the underlying operating system 802 functionality (e.g., kernel 822, services 824 and/or drivers 826). The libraries 820 may include system libraries 844 (e.g., C standard library) that may provide functions such as memory allocation functions, string manipulation functions, mathematical functions, and the like. In addition, the libraries 820 may include API libraries 846 such as media libraries (e.g., libraries to support presentation and manipulation of various media format such as MPEG4, H.264, MP3, AAC, AMR, JPG, PNG), graphics libraries (e.g., an OpenGL framework that may be used to render two-dimensional and three-dimensional in a graphic content on a display), database libraries (e.g., SQLite that may provide various relational database functions), web libraries (e.g., WebKit that may provide web browsing functionality), and the like. The libraries 820 may also include a wide variety of other libraries 848 to provide many other APIs to the applications 816 and other software components/modules.

The frameworks/middleware 818 (also sometimes referred to as middleware) provide a higher-level common infrastructure that may be used by the applications 816 and/or other software components/modules. For example, the frameworks/middleware 818 may provide various graphical user interface functions, high-level resource management, high-level location services, and so forth. The frameworks/middleware 818 may provide a broad spectrum of other APIs that may be utilized by the applications 816 and/or other software components/modules, some of which may be specific to a particular operating system 802 or platform.

The applications 816 include built-in applications 838 and/or third-party applications 840. Examples of representative built-in applications 838 may include, but are not limited to, a contacts application, a browser application, a book reader application, a location application, a media application, a messaging application, and/or a game application. Third-party applications 840 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 840 may invoke the API calls 808 provided by the mobile operating system (such as operating system 802) to facilitate functionality described herein.

The applications 816 may use built-in operating system functions (e.g., kernel 822, services 824, and/or drivers 826), libraries 820, and frameworks/middleware 818 to create UIs to interact with users of the system. Alternatively, or additionally, in some systems, interactions with a user may occur through a presentation layer, such as presentation layer 814. In these systems, the application/component "logic" can be separated from the aspects of the application/component that interact with a user.

Figure 9:
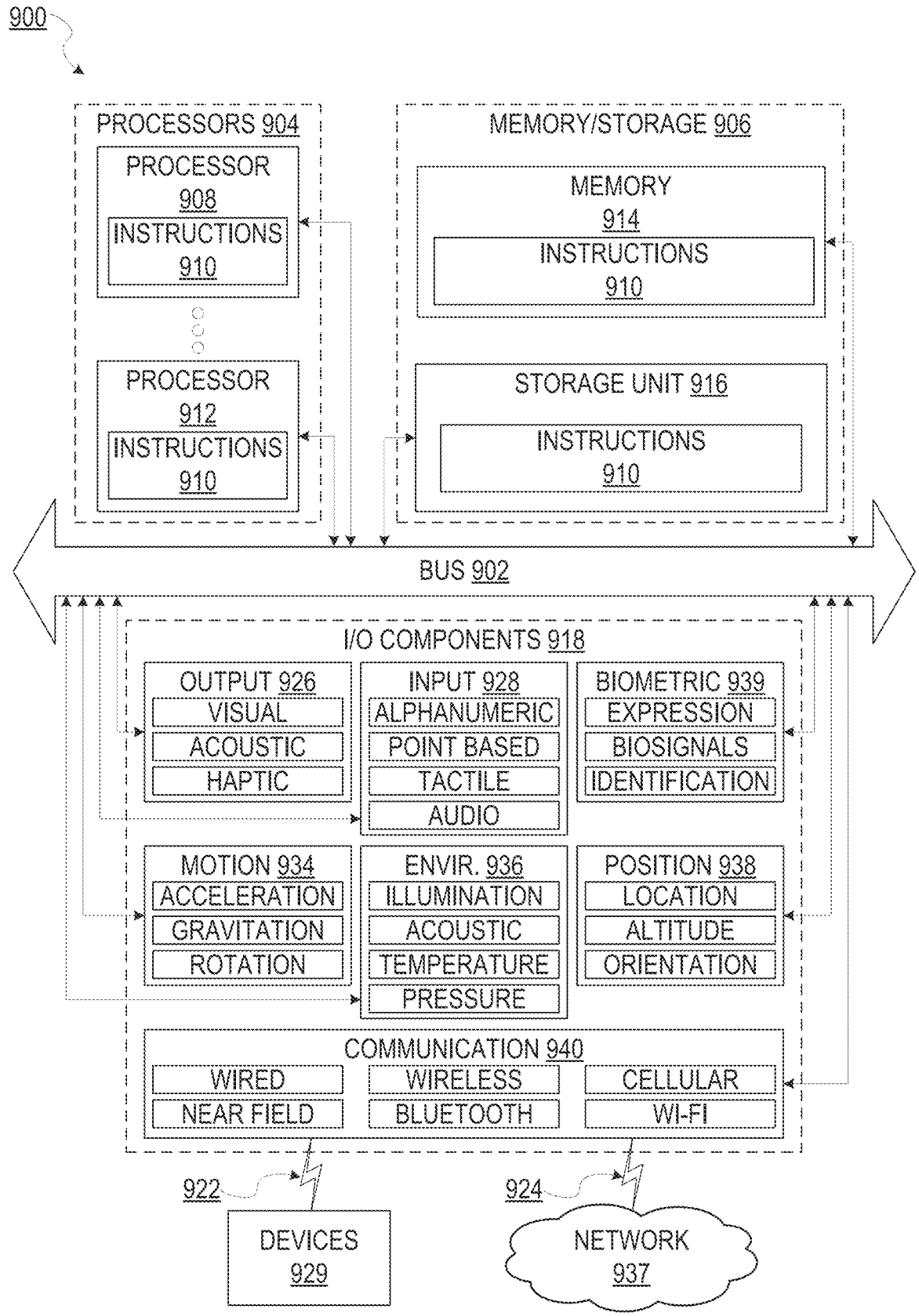
FIG. 9 is a block diagram illustrating components of a machine able to read instructions from a machine-readable medium (e.g., a machine-readable storage medium) and perform any one or more of the methodologies discussed herein, according to example embodiments.

FIG. 9 is a block diagram illustrating components of a machine 900, according to some example embodiments, able to read instructions from a machine-readable medium (e.g., a machine-readable storage medium) and perform any one or more of the methodologies discussed herein. Specifically, FIG. 9 shows a diagrammatic representation of the machine 900 in the example form of a computer system, within which instructions 910 (e.g., software, a program, an application, an applet, an app, or other executable code) for causing the machine 900 to perform any one or more of the methodologies discussed herein may be executed. As such, the instructions 910 may be used to implement modules or components described herein. The instructions 910 transform the general, non-programmed machine 900 into a particular machine 900 programmed to carry out the described and illustrated functions in the manner described. In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 910, sequentially or otherwise, that specify actions to be taken by machine 900. Further, while only a single machine 900 is illustrated, the term "machine" shall also be taken to include a collection of machines that individually or jointly execute the instructions 910 to perform any one or more of the methodologies discussed herein.

The machine 900 may include processors 904, memory/storage 906, and I/O components 918, which may be configured to communicate with each other such as via a bus 902. In an example embodiment, the processors 904 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 908 and a processor 912 that may execute the instructions 910. The term "processor" is intended to include multi-core processors 904 that may comprise two or more independent processors (sometimes referred to as "cores") that may execute instructions 910 contemporaneously. Although FIG. 9 shows multiple processors 904, the machine 900 may include a single processor 908 with a single core, a single processor 908 with multiple cores (e.g., a multi-core processor), multiple processors 908, 912 with a single core, multiple processors 908, 912 with multiple cores, or any combination thereof.

The memory/storage 906 may include a memory 914, such as a main memory, or other memory storage, and a storage unit 916, both accessible to the processors 904 such as via the bus 902. The storage unit 916 and memory 914 store the instructions 910 embodying any one or more of the methodologies or functions described herein. The instructions 910 may also reside, completely or partially, within the memory 914, within the storage unit 916, within at least one of the processors 904 (e.g., within the processor's cache memory), or any suitable combination thereof, during execution thereof by the machine 900. Accordingly, the memory 914, the storage unit 916, and the memory of processors 904 are examples of machine-readable media.

The I/O components 918 may include a wide variety of components to receive input, provide output, produce output, transmit information, exchange information, capture measurements, and so on. The specific I/O components 918 that are included in a particular machine 900 will depend on the type of machine. For example, portable machines such as mobile phones will likely include a touch input device or other such input mechanisms, while a headless server machine will likely not include such a touch input device. It will be appreciated that the I/O components 918 may include many other components that are not shown in FIG. 9. The I/O components 918 are grouped according to functionality merely for simplifying the following discussion and the grouping is in no way limiting. In various example embodiments, the I/O components 918 may include output components 926 and input components 928. The output components 926 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 928 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 918 may include biometric components 939, motion components 934, environmental components 936, or position components 938 among a wide array of other components. For example, the biometric components 939 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 934 may include acceleration sensor components (e.g., accelerometer), gravitation sensor components, rotation sensor components (e.g., gyroscope), and so forth. The environmental components 936 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 938 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 918 may include communication components 940 operable to couple the machine 900 to a network 937 or devices 929 via coupling 924 and coupling 922, respectively. For example, the communication components 940 may include a network interface component or other suitable device to interface with the network 937. In further examples, communication components 940 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 929 may be another machine 900 or any of a wide variety of peripheral devices (e.g., a peripheral device coupled via a USB).

Moreover, the communication components 940 may detect identifiers or include components operable to detect identifiers. For example, the communication components 940 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 940, such as location via Internet Protocol (IP) geolocation, location via Wi-Fi® signal triangulation, location via detecting a NFC beacon signal that may indicate a particular location, and so forth.

Glossary

"CARRIER SIGNAL," in this context, refers to any intangible medium that is capable of storing, encoding, or carrying transitory or non-transitory instructions 910 for execution by the machine 900, and includes digital or analog communications signals or other intangible medium to facilitate communication of such instructions 910. Instructions 910 may be transmitted or received over the network 106 using a transitory or non-transitory transmission medium via a network interface device and using any one of a number of well-known transfer protocols.

"CLIENT DEVICE," in this context, refers to any machine 900 that interfaces to a communications network 106 to obtain resources from one or more server systems or other client devices 102. A client device 102 may be, but is not limited to, a mobile phone, desktop computer, laptop, PDAs, smart phones, tablets, ultra books, netbooks, laptops, multi-processor systems, microprocessor-based or programmable consumer electronics, game consoles, set-top boxes, or any other communication device that a user may use to access a network 106.

"COMMUNICATIONS NETWORK," in this context, refers to one or more portions of a network 106 that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network 106 or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"EPHEMERAL MESSAGE," in this context, refers to a message 300 that is accessible for a time-limited duration. An ephemeral message may be a text, an image, a video, and the like. The access time for the ephemeral message may be set by the message sender. Alternatively, the access time may be a default setting or a setting specified by the recipient. Regardless of the setting technique, the message 300 is transitory.

"MACHINE-READABLE MEDIUM," in this context, refers to a component, device, or other tangible media able to store instructions 910 and data temporarily or permanently and may include, but is not limited to, random-access memory (RAM), read-only memory (ROM), buffer memory, flash memory, optical media, magnetic media, cache memory, other types of storage (e.g., erasable programmable read-only memory (EEPROM)) and/or any suitable combination thereof. The term "machine-readable medium" should be taken to include a single medium or multiple media (e.g., a centralized or distributed database, or associated caches and servers) able to store instructions 910. The term "machine-readable medium" shall also be taken to include any medium, or combination of multiple media, that is capable of storing instructions 910 (e.g., code) for execution by a machine 900, such that the instructions 910, when executed by one or more processors 904 of the machine 900, cause the machine 900 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT," in this context, refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an ASIC. A hardware component may also include programmable logic or circuitry that is temporarily configured by software to perform certain operations. For example, a hardware component may include software executed by a general-purpose processor 908 or other programmable processor. Once configured by such software, hardware components become specific machines (or specific components of a machine 900) uniquely tailored to perform the configured functions and are no longer general-purpose processors 908. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor 908 configured by software to become a special-purpose processor, the general-purpose processor 908 may be configured as respectively different special-purpose processors (e.g., comprising different hardware components) at different times. Software accordingly configures a particular processor 908 or processors 904, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output.

Hardware components may also initiate communications with input or output devices, and can operate on a resource (e.g., a collection of information). The various operations of example methods described herein may be performed, at least partially, by one or more processors 904 that are temporarily configured (e.g., by software) or permanently configured to perform the relevant operations. Whether temporarily or permanently configured, such processors 904 may constitute processor-implemented components that operate to perform one or more operations or functions described herein. As used herein, "processor-implemented component" refers to a hardware component implemented using one or more processors 904. Similarly, the methods described herein may be at least partially processor-implemented, with a particular processor 908 or processors 904 being an example of hardware. For example, at least some of the operations of a method may be performed by one or more processors 904 or processor-implemented components. Moreover, the one or more processors 904 may also operate to support performance of the relevant operations in a "cloud computing" environment or as a "software as a service" (SaaS). For example, at least some of the operations may be performed by a group of computers (as examples of machines 900 including processors 904), with these operations being accessible via a network 106 (e.g., the Internet) and via one or more appropriate interfaces (e.g., an API). The performance of certain of the operations may be distributed among the processors, not only residing within a single machine 900, but deployed across a number of machines. In some example embodiments, the processors 904 or processor-implemented components may be located in a single geographic location (e.g., within a home environment, an office environment, or a server farm). In other example embodiments, the processors 904 or processor-implemented components may be distributed across a number of geographic locations.

"PROCESSOR," in this context, refers to any circuit or virtual circuit (a physical circuit emulated by logic executing on an actual processor 908) that manipulates data values according to control signals (e.g., "commands," "op codes," "machine code," etc.) and which produces corresponding output signals that are applied to operate a machine 900. A processor 908 may, for example, be a CPU, a RISC processor, a CISC processor, a GPU, a DSP, an ASIC, a RFIC or any combination thereof. A processor 908 may further be a multi-core processor having two or more independent processors 904 (sometimes referred to as "cores") that may execute instructions 910 contemporaneously.

"TIMESTAMP," in this context, refers to a sequence of characters or encoded information identifying when a certain event occurred, for example giving date and time of day, sometimes accurate to a small fraction of a second.

Changes and modifications may be made to the disclosed embodiments without departing from the scope of the present disclosure. These and other changes or modifications are intended to be included within the scope of the present disclosure, as expressed in the following claims.

What is claimed is:

1. A method comprising:
    displaying, by a messaging application of a user device, a menu comprising a first set of options relating to a first level in a hierarchy of levels;
    detecting, by a touch sensor, one finger touch of a first option of the first set of options;
    in response to detecting the one finger touch of the first option, displaying, by the messaging application, a second set of options related to the first option, the second set of options relating to a second level in the hierarchy of levels;
    detecting, by the touch sensor, two finger touch and hold of a second option of the second set of options;
    in response to detecting the two finger touch and hold of the second option, re-displaying, by the messaging application, the first set of options;
    detecting, by the touch sensor, a slide of the two finger touch and hold to a third option, the third option being selected from the first set of options;
    detecting, by the touch sensor, a release of the two finger touch and hold; and
    in response to detecting the release of the two finger touch and hold, displaying, by the messaging application, at the second level in the hierarchy of levels, a third set of options related to the third option selected from the first set of options.

2. The method of claim 1, wherein the first and second sets of options are displayed on a touch screen comprising the touch sensor.

3. The method of claim 1, wherein the first and second sets of options are presented on a display device, and wherein the touch sensor is included in a handheld input device separate from the display device.

4. The method of claim 1, wherein displaying the second set of options comprises replacing the display of the first set of options with the second set of options, and wherein re-displaying the first set of options comprises replacing the display of the second set of options with the first set of options.

5. The method of claim 1, further comprising:
detecting, by the touch sensor, a touch and hold operation of a single finger of a user in relation to a fourth option in the third set of options;
in response to detecting the touch and hold operation of the single finger, displaying a fifth option for modifying an attribute of the fourth option, the fifth option related to a third level in the hierarchy of levels;
while the touch and hold operation continues to be detected, detecting movement of the single finger of the user; and
modifying the attribute of the fourth option based on the movement of the single finger.

6. The method of claim 5, further comprising:
determining, by the touch sensor, that the touch and hold operation has been terminated when contact between the single finger of the user and the touch sensor is no longer detected; and
in response to determining that the touch and hold operation has been terminated, automatically removing display of the fifth option and re-displaying the fourth option.

7. The method of claim 5, wherein the first set of options comprise different types of image modification options, wherein the first option comprises a painting image modification option, wherein the third set of options comprise different painting options, wherein the fourth option comprises a brush color selection option, and wherein the attribute modified by movement of the finger comprises a color of the brush, further comprising painting over one or more portions of an image displayed together with the fourth option in accordance with the color of the brush based on user input.

8. The method of claim 5, wherein the first set of options comprise different types of image modification options, wherein the first option comprises an image filter option for applying a filter to parts of an image that is displayed, wherein the third set of options comprise different filter parameters including at least one of a style, an intensity, quantity, and a color, wherein the fourth option comprises a quantity percentage option, and wherein the attribute modified by movement of the finger comprises a quantity of the image that is modified by a given filter, further comprising applying the given filter to the image displayed together with the fourth option in accordance with the quantity selected by the fourth option based on user input.

9. The method of claim 1, wherein the first set of options comprise different types of augmented reality options, wherein the first option comprises a first type of augmented reality that is applied to parts of an image that is displayed, wherein the second set of options comprise different augmented reality parameters.

10. The method of claim 1, wherein the first set of options comprise different types of map options comprising at least one of a navigation to an address option, information about a location option, and a zoom selection option, wherein the first option comprises the navigation to the address option, wherein the second set of options comprise a mode of transportation option, a starting location option, and an ending location option.

11. The method of claim 1, wherein the first set of options comprise different types of media playback options comprising at least one of volume option, a series episode selection option, and a frame skipping option, wherein the first option comprises the series episode selection option, wherein the second set of options comprise a plurality of episodes of the series.

12. The method of claim 1, wherein the user device comprises a head-mounted display device.

13. The method of claim 1, wherein the user device comprises a smart watch.

14. The method of claim 1, wherein the user device comprises a smart phone.

15. A system comprising:
a processor configured to perform operations comprising:
displaying, by a messaging application of a user device, a menu comprising a first set of options relating to a first level in a hierarchy of levels;
detecting, by a touch sensor, one finger touch of a first option of the first set of options;
in response to detecting the one finger touch of the first option, displaying, by the messaging application, a second set of options related to the first option, the second set of options relating to a second level in the hierarchy of levels;
detecting, by the touch sensor, two finger touch and hold of a second option of the second set of options;
in response to detecting the two finger touch and hold of the second option, re-displaying, by the messaging application, the first set of options;
detecting, by the touch sensor, a slide of the two finger touch and hold to a third option, the third option being selected from the first set of options;
detecting, by the touch sensor, a release of the two finger touch and hold; and
in response to detecting the release of the two finger touch and hold, displaying, by the messaging application, at the second level in the hierarchy of levels, a third set of options related to the third option selected from the first set of options.

16. The system of claim 15, wherein the first and second sets of options are displayed on a touch screen comprising the touch sensor.

17. The system of claim 15, wherein the first and second sets of options are presented on a display device, and wherein the touch sensor is included in a handheld input device separate from the display device.

18. The system of claim 15, wherein displaying the second set of options comprises replacing the display of the first set of options with the second set of options, and wherein re-displaying the first set of options comprises replacing the display of the second set of options with the first set of options.

19. The system of claim 15, further comprising operations for:
detecting, by the touch sensor, a touch and hold operation of a single finger of a user in relation to a fourth option in the third set of options;
in response to detecting the touch and hold operation of the single finger, displaying a fifth option for modifying an attribute of the fourth option, the fifth option related to a third level in the hierarchy of levels;
while the touch and hold operation continues to be detected, detecting movement of the single finger of the user; and
modifying the attribute of the fourth option based on the movement of the single finger.

20. A non-transitory machine-readable storage medium that includes instructions that, when executed by one or more processors of a machine, cause the machine to perform operations comprising:
- displaying, by a messaging application of a user device, a menu comprising a first set of options relating to a first level in a hierarchy of levels;
- detecting, by a touch sensor, one finger touch of a first option of the first set of options;
- in response to detecting the one finger touch of the first option, displaying, by the messaging application, a second set of options related to the first option, the second set of options relating to a second level in the hierarchy of levels;
- detecting, by the touch sensor, two finger touch and hold of a second option of the second set of options;
- in response to detecting the two finger touch and hold of the second option, re-displaying, by the messaging application, the first set of options;
- detecting, by the touch sensor, a slide of the two finger touch and hold to a third option, the third option being selected from the first set of options;
- detecting, by the touch sensor, a release of the two finger touch and hold; and
- in response to detecting the release of the two finger touch and hold, displaying, by the messaging application, at the second level in the hierarchy of levels, a third set of options related to the third option selected from the first set of options.

\* \* \* \* \*